DEFENSIVE PUBLICATION T870 T867018

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 28, 1969

867 O.G. 1095

811,195

PROCESS OF TREATING INDUSTRIAL ELASTOMERIC WASTE

Joseph John Schmitt, Jr., Louisville, Ky., assignor to E. I. du Pont de Nemours and Company, Wilmington, Del., a corporation of Delaware

Filed Mar. 27, 1969. Published Oct. 28, 1969
Int. Cl. C02c *5/02;* B01d *21/01*
U.S. Cl. 210—49
No Drawing. 6 Pages Specification

A process of treating industrial waste water containing a dispersed elastomer such as neoprene in a concentration of 0.2 to 10.0 weight percent by (a) adding a coagulating agent such as calcium hydroxide or aluminum sulfate, (b) adding fly ash, preferably simultaneously, in the amount of at least one part fly ash to one part of elastomer and (c) agitating the mixture to form a water slurry of non-sticky coagulum. The fly ash renders the coagulum non-sticky allowing the slurry to be pumped and piped for further treatment without processing delays such as blockages and pump stops.